United States Patent
Bechmann et al.

(10) Patent No.: US 12,420,857 B1
(45) Date of Patent: Sep. 23, 2025

(54) STEERING WHEEL INTERFACE WITH CONE FOR STEERING WHEEL ADJUSTMENT

(71) Applicants: thyssenkrupp Presta AG, Eschen (LI); thyssenkrupp AG, Essen (DE)

(72) Inventors: Kai Bechmann, McCordsville, IN (US); Marius Breuer, Fishers, IN (US); Christian Pichonnat, Indianapolis, IN (US); Justin Yoho, Westfield, IN (US)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 18/612,645

(22) Filed: Mar. 21, 2024

(51) Int. Cl.
*B62D 1/04* (2006.01)
*B62D 1/10* (2006.01)

(52) U.S. Cl.
CPC ..................................... *B62D 1/10* (2013.01)

(58) Field of Classification Search
CPC . B62D 1/10; B62D 1/105; B62D 1/16; B62D 1/184
See application file for complete search history.

(56) References Cited

U.S. PATENT DOCUMENTS

| | | | | |
|---|---|---|---|---|
| 1,269,341 A | * | 6/1918 | Vincent | B62D 1/10 74/556 |
| 3,165,620 A | * | 1/1965 | Miller | B62D 1/065 219/528 |
| 3,276,287 A | * | 10/1966 | Albrecht | B62D 1/185 180/78 |
| 3,670,592 A | * | 6/1972 | Senft | B62D 1/16 74/473.31 |
| 4,819,961 A | * | 4/1989 | Henigue | F16D 1/12 74/552 |
| 5,002,422 A | * | 3/1991 | Schremmer | F16D 1/08 74/552 |
| 5,617,763 A | * | 4/1997 | Cymbal | B62D 1/10 74/552 |
| 6,257,088 B1 | * | 7/2001 | Broughton | B62D 1/10 74/552 |
| 6,546,828 B2 | * | 4/2003 | Hobaugh | B62D 1/10 74/552 |

(Continued)

FOREIGN PATENT DOCUMENTS

| | | | | |
|---|---|---|---|---|
| CN | 205440509 U | * | 8/2016 | |
| CN | 118417923 A | * | 8/2024 | B23Q 3/12 |

(Continued)

OTHER PUBLICATIONS

Machine translation of CN 205440509 U obtained on Apr. 8, 2025.*
Similarity (Geometry) Wikipedia page; https://en.wikipedia.org/wiki/Similarity_(geometry).*

Primary Examiner — Adam D Rogers
(74) Attorney, Agent, or Firm — thyssenkrupp North America, LLC

(57) ABSTRACT

A steering wheel interface for a steering column including a steering spindle shaft, a steering wheel having a mounting portion, wherein the steering spindle shaft is meant to fit within the mounting portion allowing for, in an unlocked position, a relative rotational movement between a first positional angle and a second positional angle. A clamping member also included to press the steering spindle shaft and the steering wheel together and be frictionally fit against each other in a locked position.

20 Claims, 4 Drawing Sheets

(56) References Cited

U.S. PATENT DOCUMENTS

| | | | | |
|---|---|---|---|---|
| 6,561,060 | B2 * | 5/2003 | Nigrin | B62D 1/10 74/552 |
| 6,634,254 | B1 * | 10/2003 | Hodac | F16D 1/0894 74/552 |
| 6,892,606 | B2 * | 5/2005 | Lorenz | B62D 1/10 74/552 |
| 7,104,156 | B2 * | 9/2006 | Affleck | B62D 1/10 74/552 |
| 7,661,506 | B2 * | 2/2010 | Saito | B62K 5/08 180/444 |
| 8,102,138 | B2 | 1/2012 | Sekine et al. | |
| 8,910,365 | B2 * | 12/2014 | Walser | B21D 53/88 29/515 |
| 9,718,490 | B2 | 8/2017 | Tanaka et al. | |
| 10,160,473 | B2 | 12/2018 | Bodtker | |
| 10,315,682 | B2 | 6/2019 | Agbor et al. | |
| 10,385,930 | B2 | 8/2019 | Magnus et al. | |

FOREIGN PATENT DOCUMENTS

| | | | | |
|---|---|---|---|---|
| DE | 102008033695 A1 * | 1/2010 | | B62D 1/04 |
| DE | 102017208248 A1 * | 11/2018 | | B62D 3/04 |
| EP | 2923921 B1 | 9/2015 | | |
| KR | 19980038219 U * | 9/1998 | | |

\* cited by examiner

STEERING WHEEL INTERFACE WITH CONE FOR STEERING WHEEL ADJUSTMENT

FIELD

The present disclosure relates to a steering wheel interface, and more particularly to a steering wheel interface that allows for adjustment of the steering wheel after installation.

BACKGROUND

Steering columns in vehicles, especially automobiles, trucks, and industrial vehicles typically include a rotatable steering spindle and a steering wheel which are connected to each other via a mechanical connection interface. The interface is designed in a way that the steering wheel can be connected and disconnected from the steering spindle even when the steering column is already mounted within the vehicle. After assembling the steering wheel, the connection interface establishes a rotationally fixed connection between the spindle and wheel so that the vehicle can be steered. It is common that such a connection interface includes a non-circular shape for the spindle shaft end and a corresponding shape on the mount portion of the steering wheel. However, after the steering column is mounted within the vehicle the steering spindle is no longer freely rotatable without turning the vehicle wheels since they are mechanically connected to the vehicle's steering system, and because of the rotationally fixed connection interface the same is true for the steering wheel. Therefore it requires a team to adjust the rotational position of the steering wheel in the already assembled vehicle.

Thus, a need exists for a steering wheel interface that allows for installation and adjustment without the movement of the wheels or complete disassembly. There is a further need for a steering wheel interface that is easy and economical to install. The present disclosure may provide a solution for at least one of these remaining challenges.

SUMMARY

A steering wheel interface for an adjustable steering wheel column of a vehicle is disclosed. The steering wheel interface comprises a steering spindle shaft including an end portion, a steering wheel having a mounting portion, wherein the steering spindle shaft end portion is intended to fit within the mounting portion allowing for a relative rotational movement between a first positional angle and a second positional angle in an unlocked position, and a clamping member meant to press the steering spindle shaft and the steering wheel together and be frictionally fit against each other in a locked position. The steering spindle shaft end portion can include a non-circular shape, the end portion can also include a polygonal shape and the end portion can also include a plurality of flat portions and a plurality of rounded portions.

The mounting portion can be shaped non-circular, with the mounting portion and the steering spindle shaft end portion having similar shapes. The steering wheel can include a clamping portion and the steering spindle shaft can include a related clamping portion meant to press against the steering wheel clamping portion in the locked position. The clamping portions can be conical in shape, where the conical portion of the shapes include an opening angle of 10 degrees to 60 degrees, inclusive. The steering spindle shaft can taper down along the conical shape. The two related clamping portions can include different materials where different materials means either different base materials or same base materials differently treated (e.g. by mechanical, heat or chemical treatment or by surface treatment) for achieving different material properties. At least one of the materials can be a hardenable metal alloy, e.g. a hardenable steel alloy or a heat treatable aluminum alloy. At least one of the materials can be an electrically conductive non-metallic material (e.g. an injection moldable polymer or a resin with conductive filler). At least one of the clamping portions can include a coated surface, where the purpose of the surface coating can be an increase of the friction between the two clamping portion surfaces.

The steering wheel interface also can include a gap between the steering spindle shaft and the steering wheel mounting portion. The width of the gap can be chosen such that the angle difference between the first positional angle and the second positional angle of the relative rotational movement of the steering wheel in the unlocked position is in the range of 5° to 15°. The clamping member of the steering wheel interface can be a screw. Alternatively the clamping member of the steering wheel interface can be a nut or a press-fit pin. The clamping member can be secured by a positive locking connection or by a material locking connection to prevent loosening. The edges of the mounting portion and the spindle shaft end portion can be chamfered so as not to include sharp edges.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 4b shows a cut view of the end portion of the spindle shaft of FIG. 4a.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood, that the steps of any method claims need not necessarily be performed in the order in which they are recited, unless so required by the context of the claims. In addition, all references to one skilled in the art shall be understood to refer to one having ordinary skill in the art.

Figure 1:
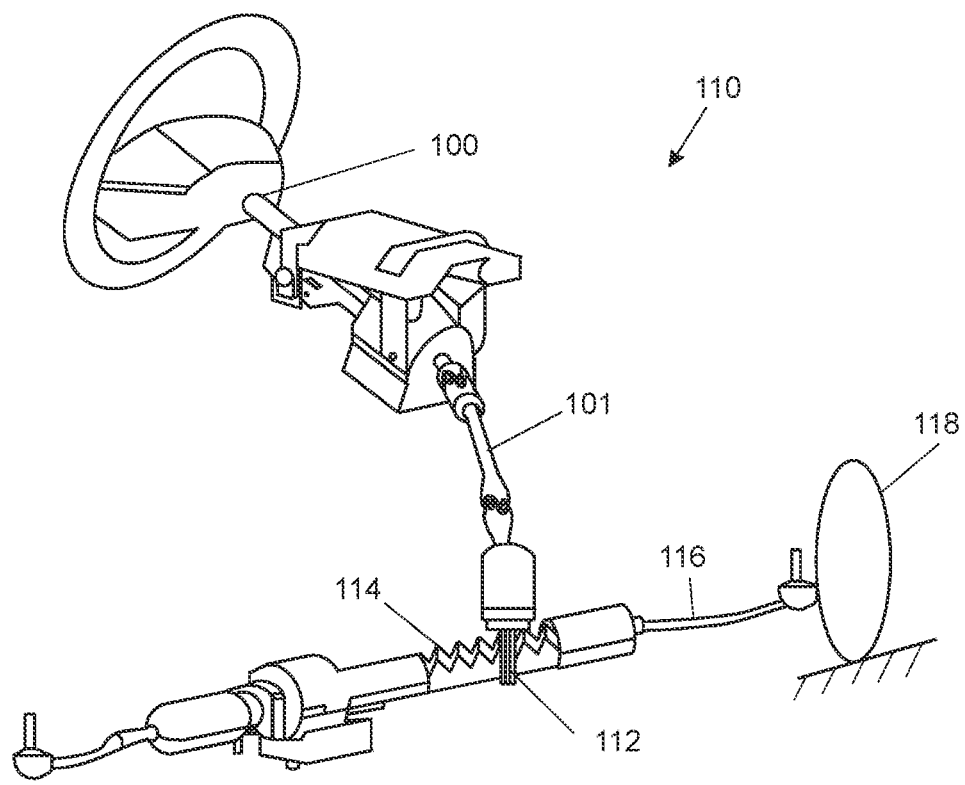
FIG. 1 shows a schematic view of a steering system according to the disclosure.

Reference will now be made to the drawings wherein like reference numerals identify similar structural features or aspects of the subject disclosure. For purposes of explanation and illustration, and not limitation, a partial view of an exemplary embodiment of a steering wheel interface in accordance with the disclosure is shown in FIG. 1 and is designated generally by reference character 100. Other embodiments of the interface in accordance with the disclosure, or aspects thereof, are provided in FIGS. 2-8, as will be described. The disclosed steering wheel interface allows for installation and adjustment without the movement of the wheels or complete disassembly, that is also easy and economical to install.

FIG. 1 shows a schematic view of a steering system 110 for an automobile including a steering wheel interface 100 and a steering shaft 101 for a mechanical steering column. When assembled, the steering actuating torque is converted there by means of a pinion 112 and a steering rack 114 into a translatory movement of track rods 116, as a result of which a steering movement of the steered wheels 118 is brought about.

Figure 2:
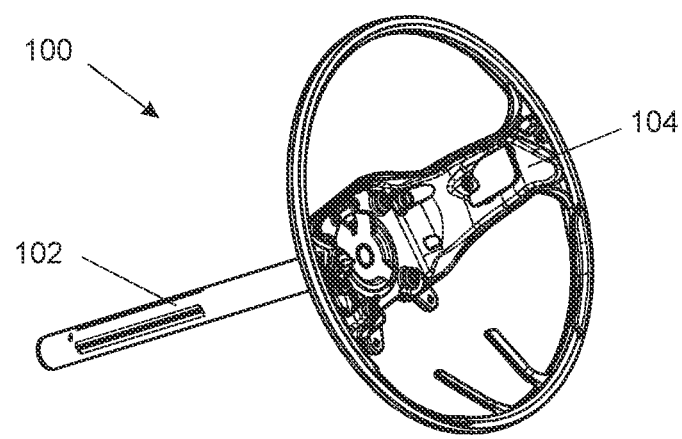
FIG. 2 shows perspective view of a steering wheel attached to a steering spindle shaft of FIG. 1.
Figure 3:
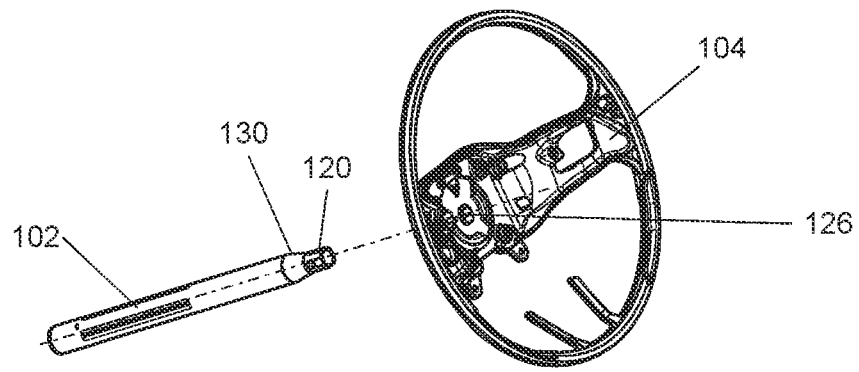
FIG. 3 shows an exploded perspective view of the steering wheel and the spindle shaft of FIG. 1.
Figure 4A:
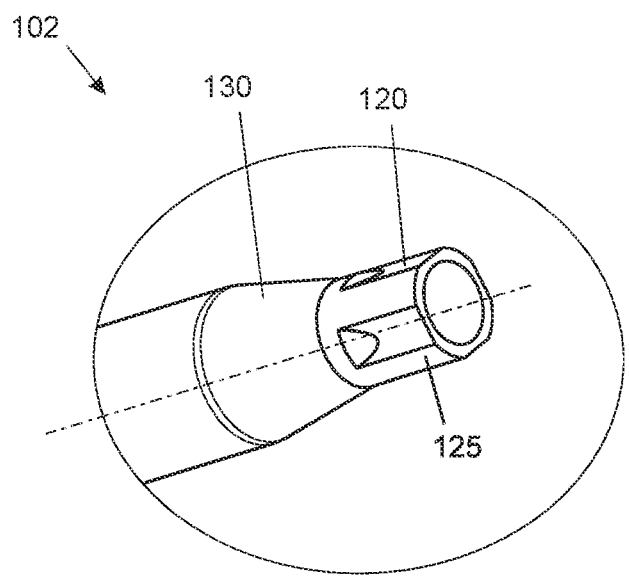
FIG. 4a shows a perspective view of an end of the spindle shaft of FIG. 1.
Figure 4B:
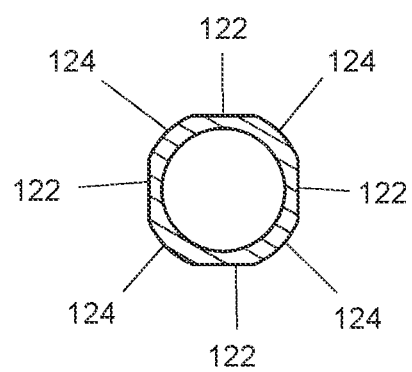
Figure 8:
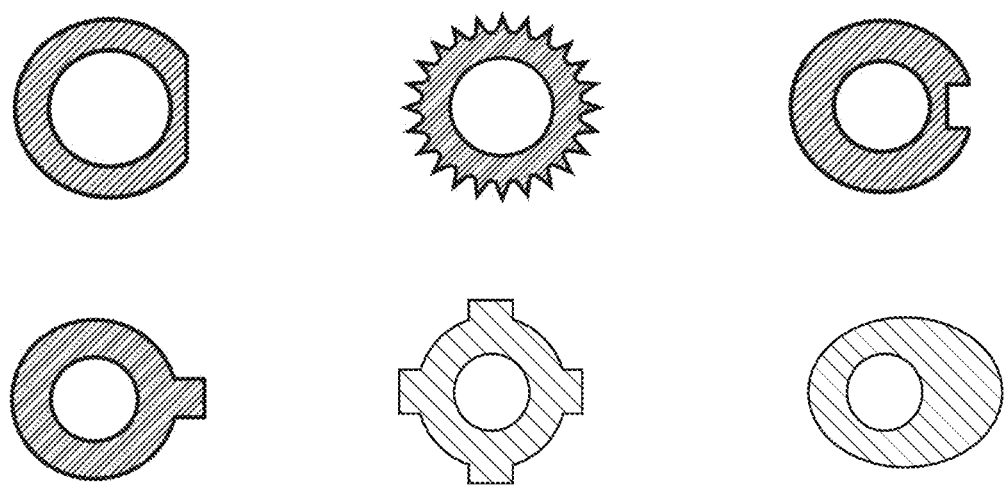
FIG. 8 shows alternative spindle shaft ends in the same cut view position as FIGS. 4b, 6 and 7.

FIG. 2 shows the steering wheel interface 100 having a steering spindle shaft 102 connected to a steering wheel 104. The steering spindle shaft 102 fits in the steering wheel 104 while allowing for relative rotational movement in an unlocked position, and ensure a proper tight fit for use after being secured by a clamping member (shown in FIG. 5). FIG. 3 shows an exploded perspective view of the steering wheel 104 and the spindle shaft 102 exposing an end portion of the spindle shaft 120 on a mounting portion of the steering wheel 126. The end portion 120 includes a non-circular shape, allowing the shaft to be inserted into the steering wheel and not be rotated through when fixed in place. FIGS. 4a and 4b show the end portion 120 having flat portions 122 and rounded portions 124 defining a polygonal shape as one possibility for such a non-circular shape. Other possible shapes are shown in FIG. 8 The combination of rounded portions 124 and flat portions 122 allows the spindle shaft 102 to slightly rotate when inserted into the steering wheel 104.

Figure 5:
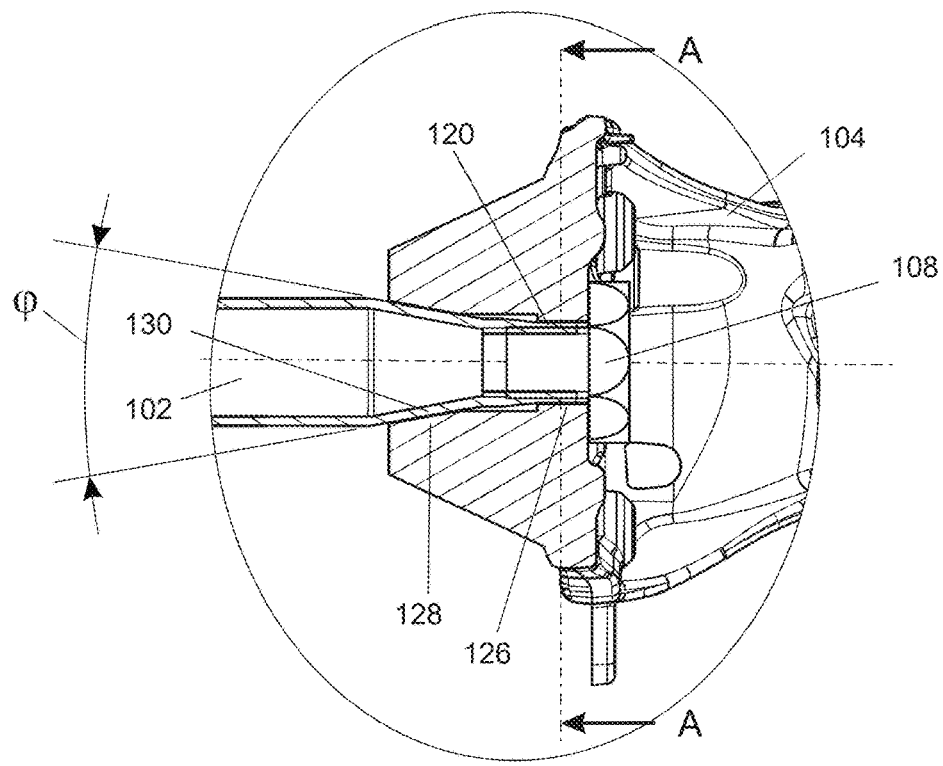
FIG. 5 shows a through-cut view of a portion of the steering system of FIG. 1, showing a connection between the steering wheel and the spindle shaft.

FIG. 5 shows a clamping member 108 inserted into an orifice 144 (FIGS. 6 and 7) of the spindle shaft that presses the steering spindle shaft 102 and the steering wheel 104 together to ensure the two are frictionally fit against each other in a locked position, not allowing for any further adjustment. The clamping member 108 can be a screw or a nut or a press-fit pin. The clamping member 108 is secured on the spindle shaft by a positive locking connection such as a serrated lock washer or a safety cotter pin or splint or wire or by a material locking connection such as a threadlocker coating to prevent loosening. The clamping member 108 is placed into the steering wheel 104 to reach the spindle shaft 102, and presses the steering wheel 104 and pulls the spindle shaft 102 to a secure connection.

Figure 6:
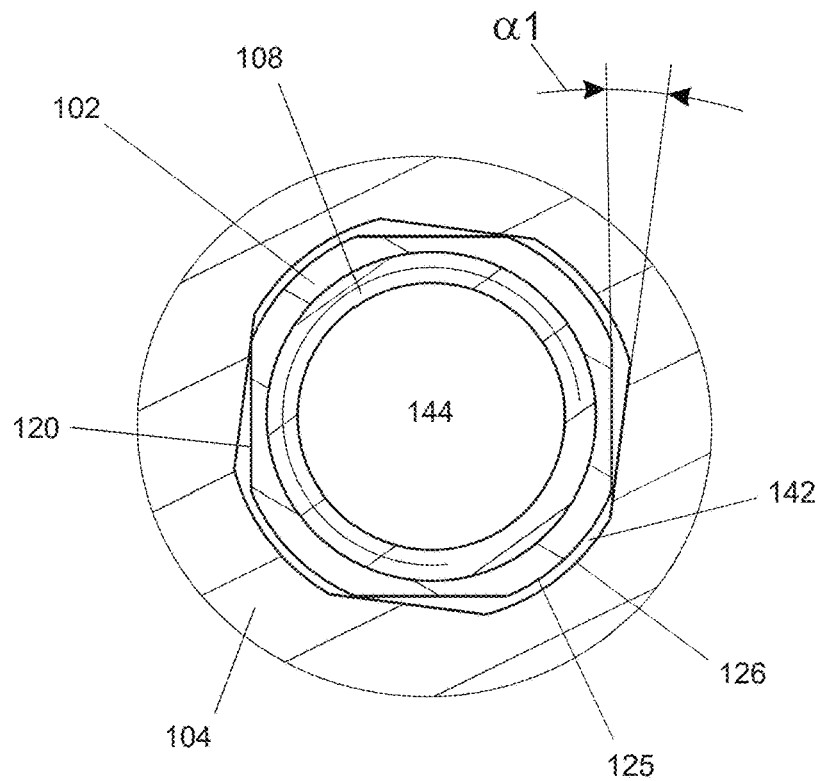
FIG. 6 shows a detailed cut view of the interface between the steering wheel and the spindle shaft, showing a position of the steering wheel mounted to the spindle shaft.
Figure 7:
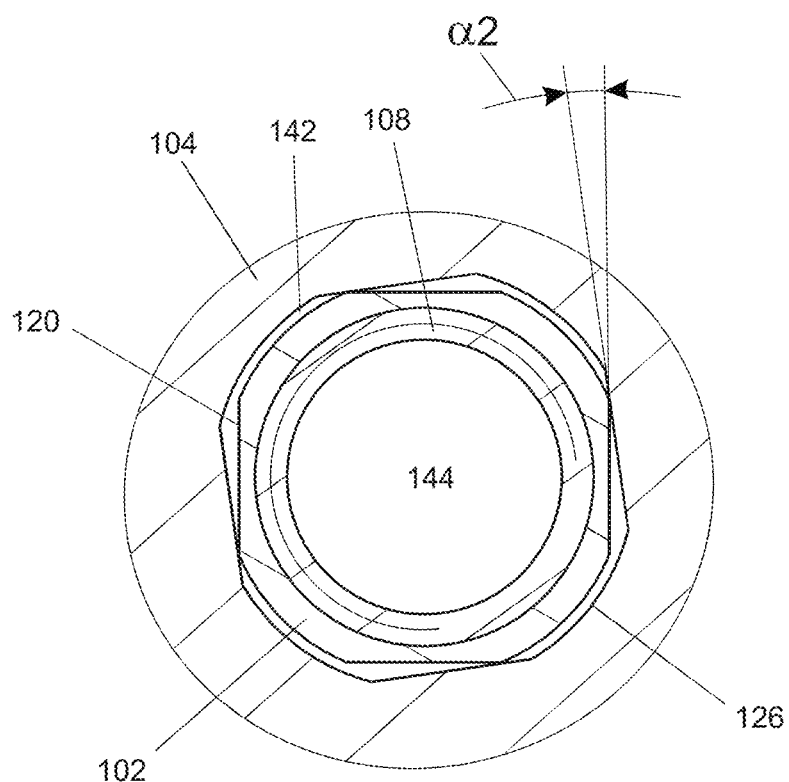
FIG. 7 shows a detailed cut view of the interface between the steering wheel and the spindle shaft, showing another position of the steering wheel mounted to the spindle shaft displaying the freedom of movement.

The spindle shaft end 120 includes a spindle shaft mounting portion 125 that is inserted into a corresponding steering wheel mounting portion 126 of the steering wheel 104. The mounting portion 126 of the steering wheel 104 and the mounting portion 125 of the spindle shaft end 120 are both non-circular shaped and are complementary shapes (as can be seen in FIGS. 6 and 7), both having flat and rounded sections. The steering wheel 104 also includes a clamping portion 128 and the steering spindle shaft 102 includes a clamping portion 130 which press against each other in the locked position when secured by the clamping member 108. The clamping portions 128, 130 are slanted and conical at an opening angle $\varphi$ between 10 and 60 degrees. The steering spindle shaft 102 tapers down along the clamping portion 130 to spindle shaft end 120.

The clamping portion 128 of the steering wheel 104 and the clamping portion 130 of the shaft 102 may include different materials. At least one of the materials can be a hardenable metal. At least one of the materials can be an electrically conductive non-metallic material.

When the spindle shaft 102 is inserted into the steering wheel 104 a gap 142 is present between the respective mounting portions (e.g., the spindle shaft mounting portion 125 of the spindle shaft end 120 and the steering wheel mounting portion 126 of the steering wheel 104) as can be seen in FIGS. 6 and 7. This gap 142 remains when the spindle shaft 102 and the steering wheel 104 are secured in place by the clamping member 108. However, unlike typical steering wheel interfaces that require disassembly for minor corrections, the present steering wheel interface 100 benefits from the spindle shaft mounting portion 125 of the spindle shaft 102 being fit into the steering wheel mounting portion 126 of the steering wheel 104 allowing for a relative rotational movement between a first positional angle $\alpha_1$ and a second positional angle $\alpha_2$ in an unlocked position, i.e. while the clamping member 108 is not fully secured. The width of the gap 142 is chosen such that the difference angle between the first positional angle $\alpha_1$ and the second positional angle $\alpha_2$ is in a range between 5° and 15°. Explained further, the width of the gap 142 specifically accommodates (limits) relative rotational movement between the spindle shaft 102 and steering wheel 104 between the first position shown in FIG. 6 wherein flat portions 122 of the spindle shaft 102 engage the steering wheel 126 in a first rotational direction (that yields the first positional angle $\alpha_1$) and the second position shown in FIG. 7 wherein the flat portions 122 of the spindle shaft 102 engage the steering wheel 104 in a second (opposite) rotational direction (that yields the second positional angle $\alpha_2$).

In this interface 100 it is possible to adjust the rotational position of the steering wheel 104 by first loosely assembling the steering wheel 104 to the spindle by connecting the steering wheel mounting portion 126 and the spindle shaft end 120, at the factory, while not fully securing the clamping member 108, then adjusting the rotational position of the wheel 104 (at the factory or at a dealership after delivery), and finally fixing the adjusted position by clamping the wheel 104 to the spindle shaft 102 using the clamping member 108 such that the clamping portions 128 and 130 are frictionally fixed in place. This interface also allows for a quick and easy re-adjustment if necessary, after initial assembly.

The system of the present disclosure, as described above and shown in the drawings provide for a steering system with superior properties including increased reliability and ease of use. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A steering wheel interface for a steering column comprising:
a steering spindle shaft including an end portion;
a steering wheel having a mounting portion, wherein the steering spindle shaft end portion is configured to fit within the mounting portion allowing for a relative rotational movement between a first positional angle and a second positional angle in an unlocked position; and
a clamping member configured to press the steering spindle shaft and the steering wheel together and be frictionally fit against each other in a locked position;
wherein the steering spindle shaft end portion has a non-circular shape including a plurality of flat portions and a plurality of rounded portions.

2. The steering wheel interface of claim 1, wherein the mounting portion is non-circular shaped.

3. The steering wheel interface of claim 1, wherein the mounting portion and the steering spindle shaft end portion have similar shapes.

4. The steering wheel interface of claim 1, wherein the steering wheel includes a clamping portion and the steering spindle shaft includes a clamping portion configured to press against the steering wheel clamping portion in the locked position.

5. The steering wheel interface of claim 4, wherein the clamping portions are conical in shape.

6. The steering wheel interface of claim 5, wherein the conical shapes include an opening angle of greater than or equal to 10 degrees and less than or equal to 60 degrees.

7. The steering wheel interface of claim 4, wherein the steering spindle shaft tapers down along the conical shape.

8. The steering wheel interface of claim 4, wherein the clamping portions include different materials.

9. The steering wheel interface of claim 4, wherein at least one of the clamping portions include a hardenable metal alloy material.

10. The steering wheel interface of claim 4, wherein at least one of the clamping portions include an electrically conductive non-metallic material.

11. The steering wheel interface of claim 1, further comprising a gap between the steering spindle shaft and the steering wheel mounting portion.

12. The steering wheel interface of claim 11, wherein the width of the gap limits relative rotation between the steering spindle shaft and the steering wheel mounting portion such that the angle difference between the first positional angle and the second positional angle of the relative rotational movement of the steering wheel in the unlocked position is in the range of 5° to 15°.

13. The steering wheel interface of claim 1, wherein the clamping member is one of a screw or a nut or a press-fit pin.

14. The steering wheel interface of claim 1, wherein the clamping member is secured by a positive locking connection or by a material locking connection to prevent loosening.

15. The steering wheel interface of claim 1, wherein the edges of the mounting portion and the spindle shaft end portion are chamfered.

16. A steering wheel interface for a steering column comprising:
a steering spindle shaft including an end portion;
a steering wheel having a mounting portion, wherein the steering spindle shaft end portion is configured to fit within the mounting portion allowing for a relative rotational movement between a first positional angle and a second positional angle in an unlocked position; and
a clamping member configured to press the steering spindle shaft and the steering wheel together and be frictionally fit against each other in a locked position;
wherein the steering spindle shaft end portion has a polygonal shape.

17. The steering wheel interface of claim 16, further comprising a gap between the steering spindle shaft and the steering wheel mounting portion;
wherein the width of the gap limits relative rotation between the steering spindle shaft and the steering wheel mounting portion such that the angle difference between the first positional angle and the second positional angle of the relative rotational movement of the steering wheel in the unlocked position is in the range of 5° to 15°.

18. The steering wheel interface of claim 16, wherein the mounting portion and the steering spindle shaft end portion have similar shapes.

19. A steering wheel interface for a steering column comprising:
a steering spindle shaft including an end portion;
a steering wheel having a mounting portion, wherein the steering spindle shaft end portion is configured to fit within the mounting portion, with a gap between the steering spindle shaft and the steering wheel mounting portion, allowing for a relative rotational movement between a first positional angle and a second positional angle in an unlocked position; and
a clamping member configured to press the steering spindle shaft and the steering wheel together and be frictionally fit against each other in a locked position;
wherein the width of the gap limits relative rotation between the steering spindle shaft and the steering wheel mounting portion such that the angle difference between the first positional angle and the second positional angle of the relative rotational movement of the steering wheel in the unlocked position is in the range of 5° to 15°.

20. The steering wheel interface of claim 19, wherein the mounting portion and the steering spindle shaft end portion have similar shapes.

* * * * *